United States Patent [19]

Van Den Berg

[11] Patent Number: 5,383,652
[45] Date of Patent: Jan. 24, 1995

[54] ENGINE MOUNTING AND TRANSPORTATION APPARATUS

[75] Inventor: Henricus F. G. M. Van Den Berg, Auckland, New Zealand

[73] Assignee: Air New Zealand Limited, Auckland, New Zealand

[21] Appl. No.: 9,949

[22] Filed: Jan. 27, 1993

[30] Foreign Application Priority Data

Jan. 27, 1992 [NZ] New Zealand .................. 241415

[51] Int. Cl.⁶ ............................................. B66F 5/04
[52] U.S. Cl. .................................. 269/17; 269/52; 269/51; 29/281.5; 29/281.4
[58] Field of Search ............... 294/82.1; 269/17, 47, 269/52, 50, 46, 51; 254/134, 133; 29/281.4, 281.5

[56] References Cited

U.S. PATENT DOCUMENTS

| | | | |
|---|---|---|---|
| 2,703,252 | 3/1955 | Blackwell | 269/46 |
| 2,741,830 | 4/1956 | Lewis | 269/17 |
| 3,773,312 | 11/1973 | Victorino | 264/52 |
| 3,949,976 | 4/1976 | Cofer | 269/17 |
| 4,177,978 | 12/1979 | Warsaw | 269/17 |
| 4,307,877 | 12/1981 | Rogos | 269/17 |
| 4,381,055 | 4/1983 | Picaud | 269/46 |

Primary Examiner—Robert C. Watson
Attorney, Agent, or Firm—Oblon, Spivak, McClelland, Maier & Neustadt

[57] ABSTRACT

An engine mounting apparatus, particularly suitable for a large aircraft engine, has a front member able to receive and support a front engine portion separated from the rear engine portion which can be loaded on to and supported by a transportable stand. The support framework enables the front engine portion to be inverted and loaded on to a pallet for transportation purposes.

6 Claims, 15 Drawing Sheets

ENGINE MOUNTING AND TRANSPORTATION APPARATUS

BACKGROUND OF INVENTION

The term "engine" is used in this specification particularly but not exclusively in respect of large industrial gas turbine engines but it will be appreciated by those skilled in the engineering arts that the present invention could also find application in respect of the mounting of other large sized machinery such as generators, turbines, alternators and the like.

The present invention will now be described particularly in respect of the mounting for transport purposes of an engine particularly an industrial gas turbine engine.

To the present time the transport of large size engines from place to place has proved costly. Larger sized engines such as the LM 5000, as a complete unit, are required to be carried on the upper deck of an aircraft, i.e. transportation is not possible in the lower cargo compartment of a regular passenger aircraft. There is therefore considerable inconvenience and expense in using a specific freight carrying aircraft for transporting the engine, such as between an engine operating facility and an engine overhaul center, or between the manufacturer and the overhaul center.

Where the engine overhaul center is located at a relatively geographically remote country such as New Zealand, the costs of transport using freight only aircraft can be substantial.

It is an object of the present invention to thus provide an engine mounting apparatus which can facilitate the mounting and transportation of an engine or which at least will provide the public with a useful choice.

Further objects of this invention will become apparent from the following description.

SUMMARY OF THE INVENTION

According to one aspect of the present invention there is thus provided an engine mounting apparatus comprising first and second spaced apart framework members for receiving and supporting respective front and one of rear portions of the engine and part of the engine, the front and said one of the rear portion of the engine and the part of the engine being separable from one another, the first framework member having first and second sections which define therebetween at an angle of substantially 90 degrees, the first section having a first securing mechanism for securing the first section when in a substantially vertical portion with one of a front end of the front portion of the engine and the part of the engine, and the second framework section having a supporting mechanism for supporting, when in a ground engaging substantially horizontal position, one of a rear end of the front portion of the engine and the part of the engine upon one of the rear portion of the engine and part of the engine being moved away. The first section includes a hoist connection mechanism to enable the first framework member to be lifted with one of the front portion of the engine and the part of the engine secured thereto and for the first framework member to be turned substantially 90 degrees, a front portion of the first section having a second securing mechanism to secure the first section when turned through substantially 90 degrees with a transporting mechanism for carrying the first framework member and the one of the front portion of the engine and the part of the engine secured thereto in the lower cargo compartment of a passenger aircraft.

According to a further aspect of the present invention there is provided an apparatus as immediately above defined wherein said first framework member is adapted to be secured in said second disposition to a pallet means which is able to fit within the lower cargo compartment of an aircraft.

According to a still further aspect of the present invention there is provided an apparatus as immediately above defined wherein said engine is able to be split into front and rear parts with said first and second framework members adapted to support and hold respective front and rear portions of said front part of the engine.

According to a still further aspect of the present invention there is provided a method of mounting an engine for transportation comprising:

i) Supporting said engine respectively at its front and rear portions;

ii) Removing said rear portion from said front portion so that said front portion is supported and held at its respective front and rear sections by a supporting framework;

iii) Inverting said front portion of said engine with its supporting framework;

iv) Mounting said framework on a transporting means,

Further aspects of this invention which should be considered in all its novel aspects will become apparent from the following description given by way of example of possible embodiments thereof.

BRIEF DESCRIPTION OF THE DRAWINGS

Reference is made to the accompanying drawings wherein.

DESCRIPTION OF PREFERRED EMBODIMENTS

Referring to FIGS. 1 to 8 of the accompanying drawings, FIGS. 1 to 6 show very diagrammatically a sequence for the mounting and holding of the front part of an engine ready for transportation.

Figure 1:
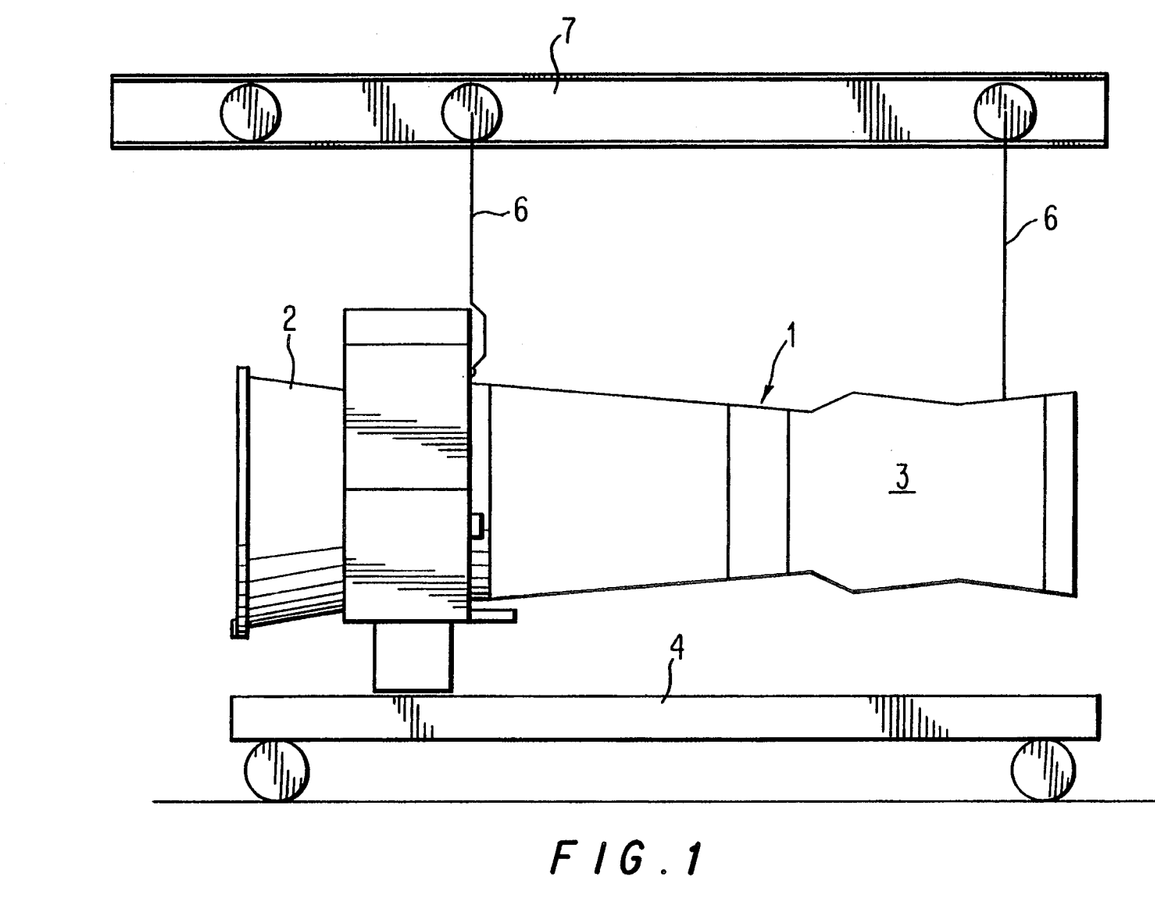
FIG. 1 shows very diagrammatically the complete engine as received and initially supported awaiting transportation.

The engine referenced generally by arrow 1 has a front portion 2 and a rear portion 3. The engine 1 is shown having been delivered on the engine stand 4 and hoist 6 of an overhead gantry 7 are shown providing a support for the engine front and rear sections 2 and 3 respectively.

Figure 2:
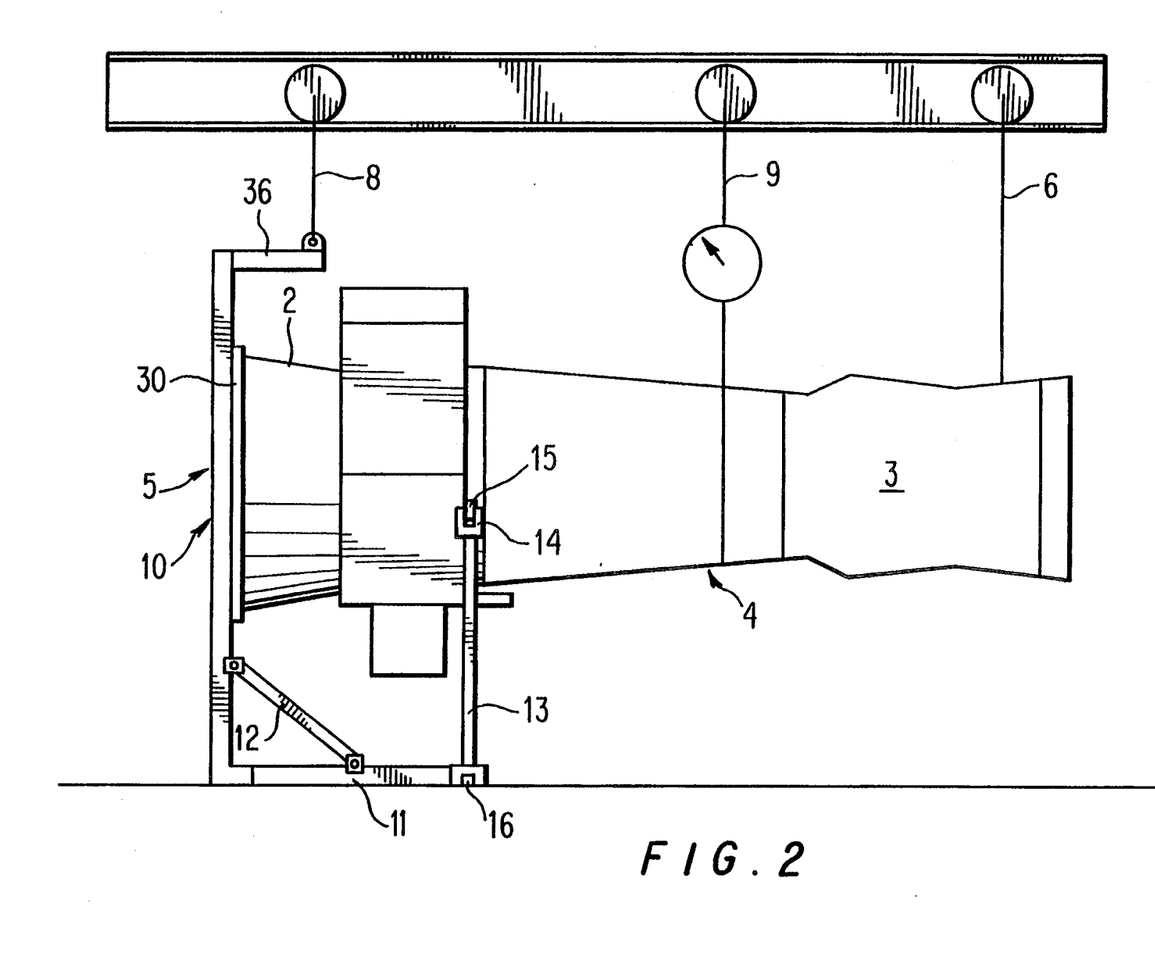
FIG. 2 shows diagrammatically the front part of the engine of FIG. 1 supported by a framework according to one embodiment of the present invention.

In FIG. 2 a support apparatus framework referenced generally by arrow 5 is shown positioned about the engine front 2. An arm 36 of the framework 5 is shown connected to and supported by hoist 8 to position the framework 5 on the front part 2 of the engine 1. A hoist 9 is shown now provided at a mid-section of the rear engine part 3. Framework 5 is bolted to the front part 2 of the engine 1. Hoist 8 is connected to lifting lug 37 located directly above framework 5. A further lug 37A is also shown for use in lifting the unit, providing greater strength than the other lug 37.

The framework 5 will be described in more detail in respect of FIGS. 7 and 8. However, as shown in FIG. 2 the framework 5 has a first framework section 10 which as shown is adapted to receive and support a front flange 30 of the engine front part 2. Typically, and as will become clearer hereinafter, the flange 30 may be bolted to a corresponding flange provided for the framework portion 10.

A second framework portion 11 is shown providing ground support for the framework 5, struts 12 suitably being provided on each side connecting the framework portions 10 and 11 together.

A pair of arms 13, one each side, are shown extending upwardly from the rear portion of the framework portion 11 with forked ends 14 engaging with a support flange 15 provided on each side of the rear portion of the engine front part 2.

In this position shown in FIG. 2 the hoists 6 and 9 are adjusted so as to be properly supporting the weight of the rear engine end 3 to enable it to be withdrawn laterally away from the front engine part 2. An adjustable support member, suitably an hydraulic ram indicated in outline at 16, can be adjusted so as to ensure that the arms 13 are properly supporting the engine part 2 at the flanges 15. A load sensor may suitably be provided associated with the adjustment means 16, to detect the load being carried so as to ensure that it is at a required level. The adjustment means 16 may also be utilized in order to compensate for any unevenness of the ground on which the framework part 11 is situated.

Figure 3:
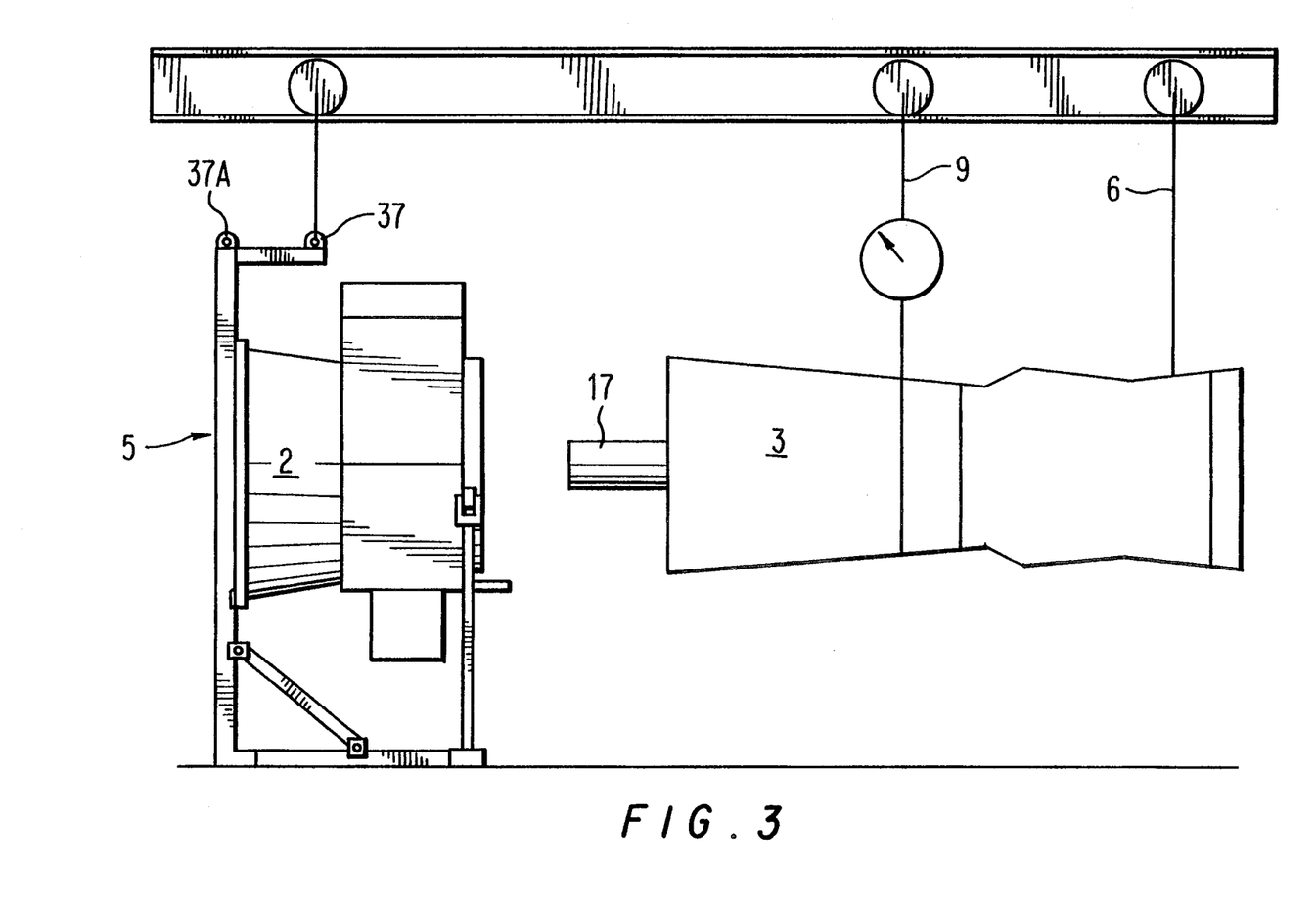
FIG. 3 shows the engine of FIG. 2 with the rear part of the engine separated from the forward part of the engine.

In FIG. 3 the rear engine part 3 is shown moved away from the front engine part 2, taking the engine shaft 17 as part of the rear engine assembly 3.

Figure 4:
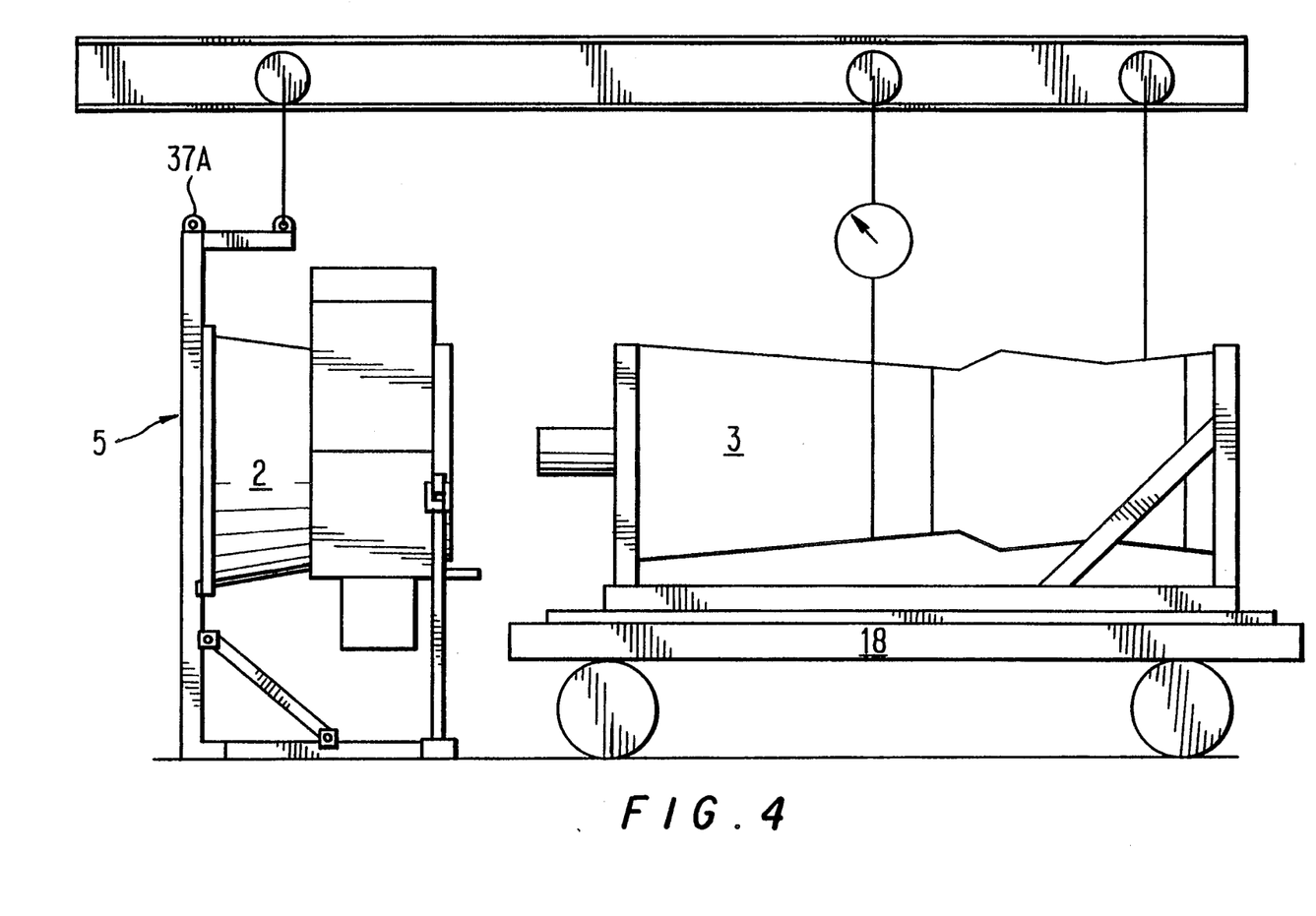
FIG. 4 shows the engine of FIG. 3 with the rear part of the engine now supported on a support stand.

In FIG. 4 the rear engine part 3 is shown loaded onto and supported by a transportable stand 18.

Figure 5:
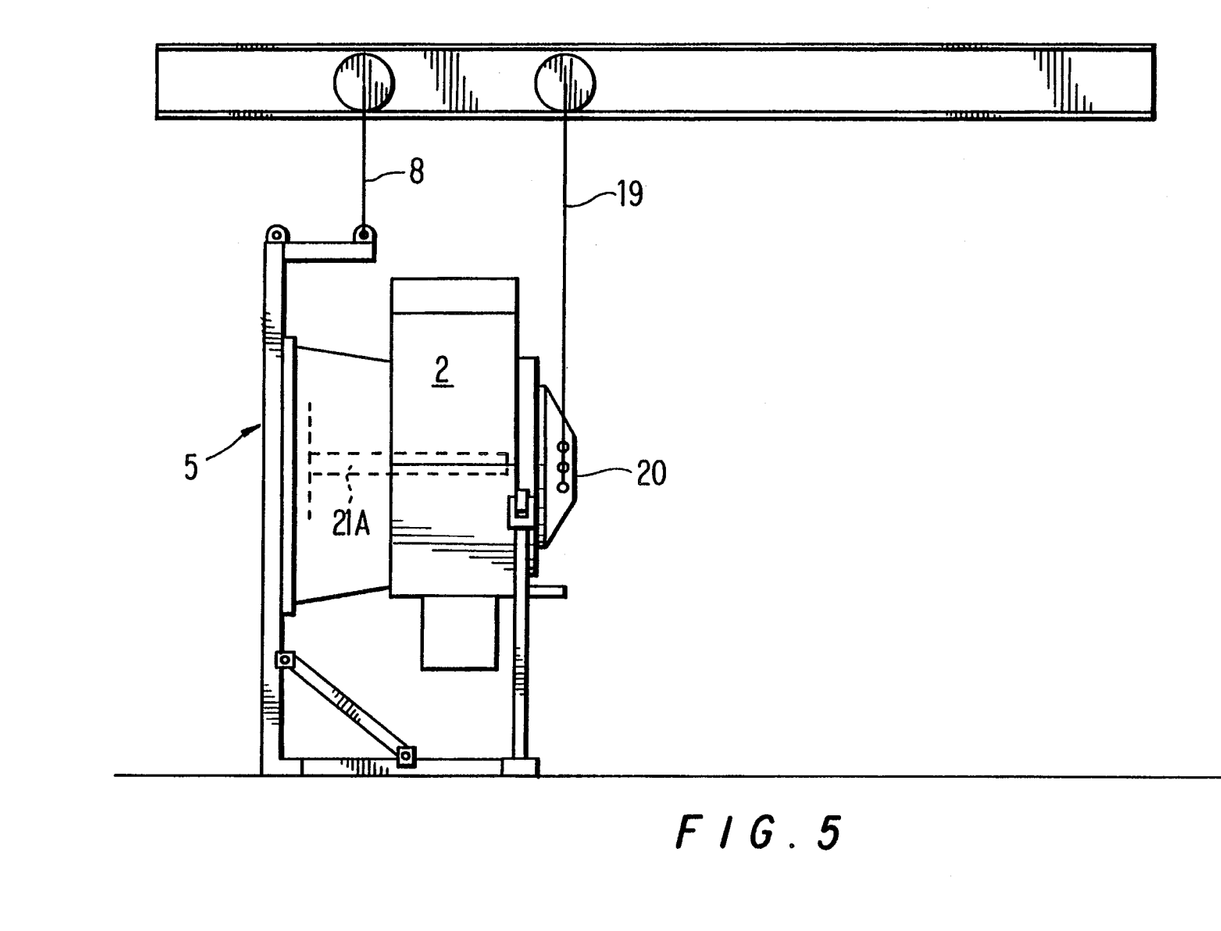
FIG. 5 shows the front part only of the engine of FIG. 4 outfitted with a bearing pre-load fixture.

In FIG. 5 a hoist member 19 is shown supporting a bearing preload and turnover fixture 20. Fixture 20 applies on axial load to the end of a shaft assembly 21A, shown in outline, for the purpose of loading the bearing assembly within the front engine part 2 and so as to prevent damage of the bearing assembly during transportation. It is to be appreciated that with the removal of the shaft 17 from the front engine part 2 there is a possibility of the internal components of the front engine part 2 being otherwise vibrated and possibly damaged during transportation.

Figure 6:
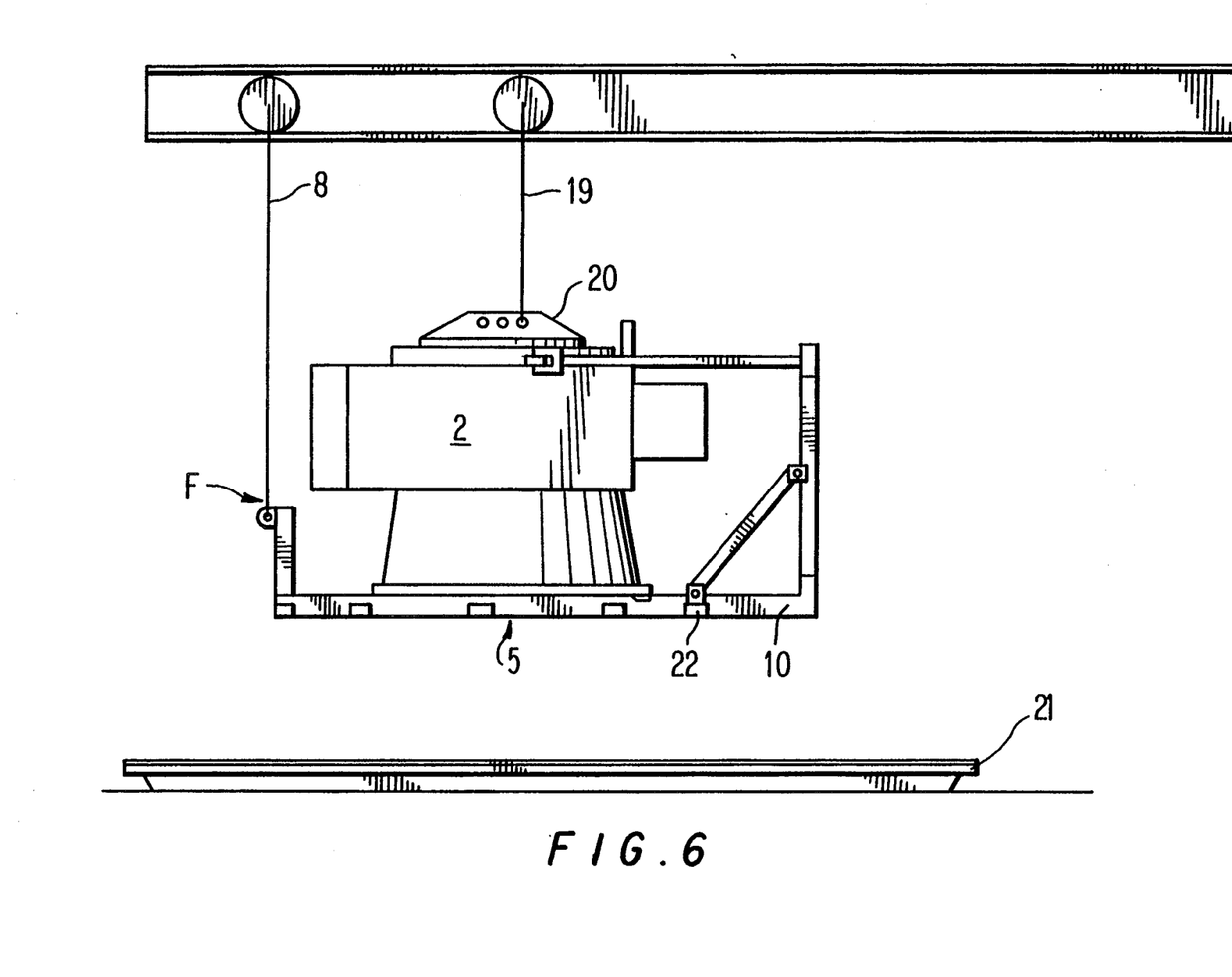
FIG. 6 shows the engine of FIG. 5 now rotated 90° with its supporting framework ready for mounting on a transport pallet.

In FIG. 6 the hoists 8 and 19 have been manipulated so that the front engine part 2, complete with the bearing preload and turnover fixture assembly 20 and the framework 5, have now been rotated 90° so that framework member 10 is now horizontal when it can be lowered onto a transport pallet 21. Typically the transport pallet 21 will comprise one of the standard metal pallets which are used for transporting cargo internationally and onto which the framework member 10 can be bolted or otherwise secured such as by flanges 22 provided along the framework member 10.

Once the framework 5, with the front engine part 2 mounted thereon, has been secured to the pallet 21 the entire assembly is then ready for transportation. In the example mentioned previously of an LM 5000 engine, the front part 2 mounted in this manner on framework 5 and then on pallet 21 is able to be carried in the lower cargo compartment of a passenger aircraft such as a Boeing 747 and will not require transportation using a specialized freight-only aircraft.

Figures 7, 8:
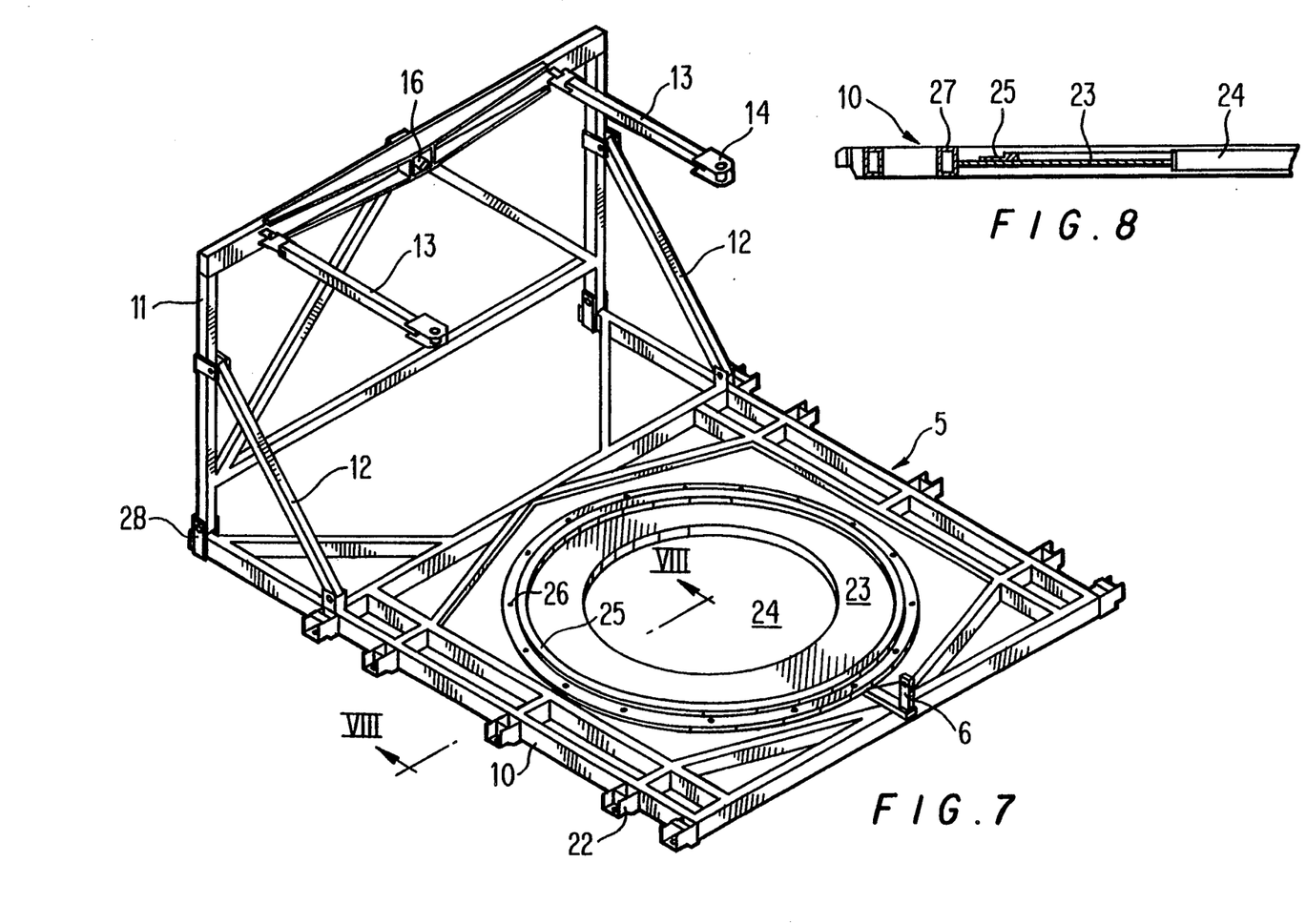
FIG. 7 shows the support framework of the preceding figures with the engine omitted.
FIG. 8 shows a view along arrows VII—VII of FIG. 7.
Figure 9:
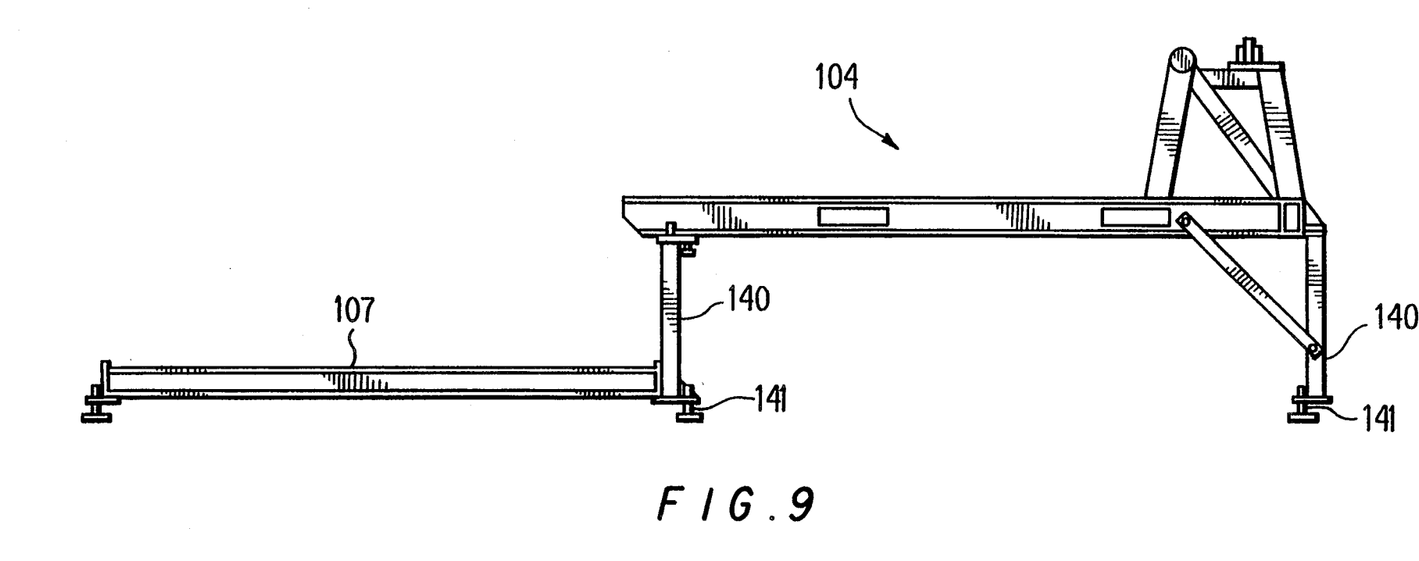
FIG. 9 shows a side view of part of a framework according to a further embodiment of the invention.
Figure 10:
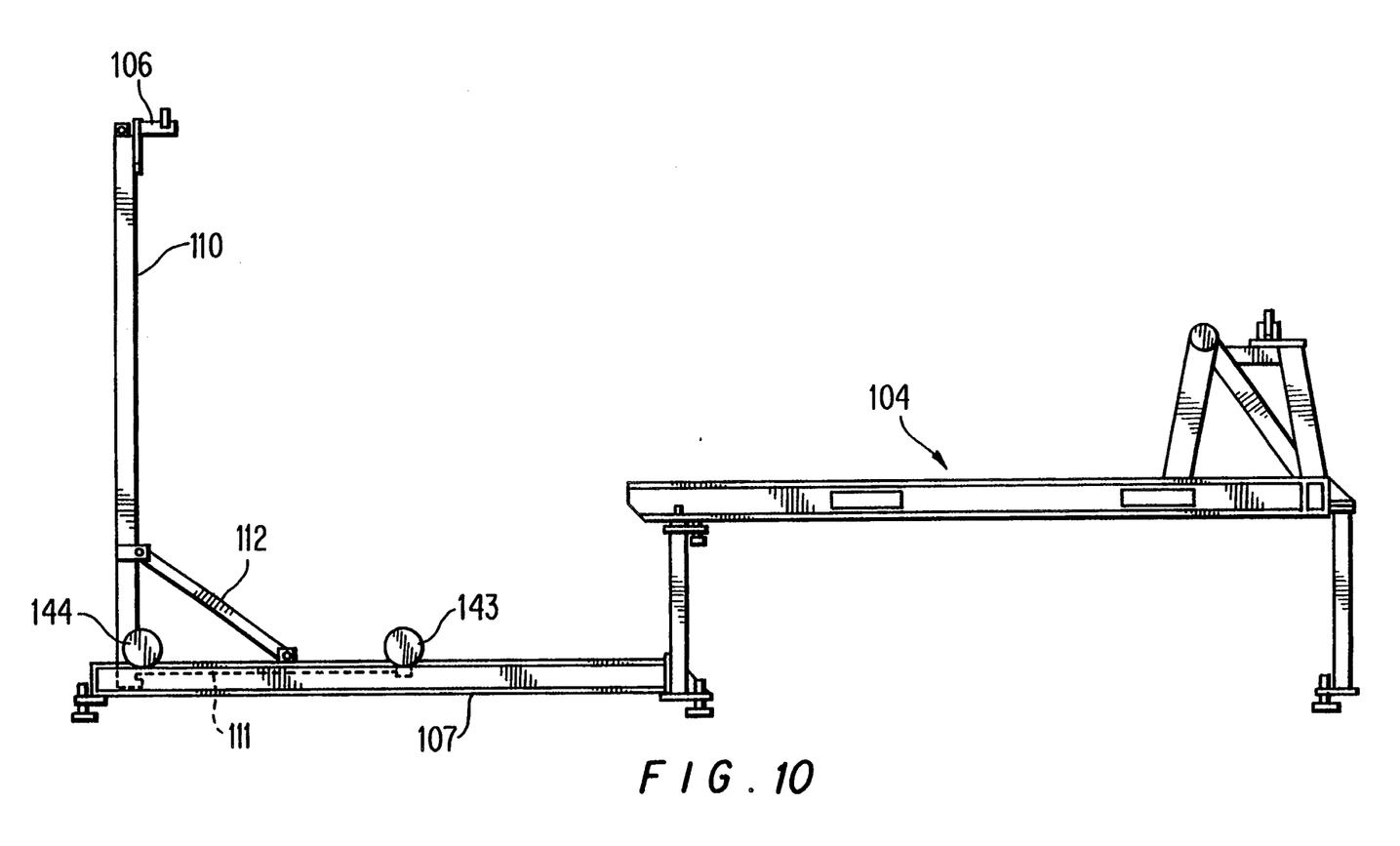
FIG. 10 shows the framework of FIG. 9 with an additional front portion added.

Referring now to FIGS. 7 and 8, the mounting apparatus or framework 5 is shown in greater detail than that in the diagrammatical illustrations of the preceding Figures. The framework 5 is essentially shown in the same position as illustrated in FIG. 6 but looking into the framework in the direction of arrow F of FIG. 6.

The framework member 10 is shown having an apertured central plate 23 with the central aperture 24 enabling access within the engine front part 2 once mounted such as for the positioning of the bearing preload fixtures 20,21. The plate 23 is shown surrounded by a rim 25 which may be provided with a plurality of engine securing means such as through apertures 26 able to receive bolts which will secure the rim 25 about the flange 30 of the front engine part 2 (see FIG. 2).

In one embodiment of the invention, as shown in FIG. 8, the rim 25 and the plate 23 may be recessed within the surrounding framework members 27 so that when the front engine part 2 is mounted in position as shown in FIG. 6 this recessing will tend to lower the overall height of the mounted engine and thus facilitate the entry of the mounted engine into the lower cargo hold of the aircraft. This overall height can be critical as there may be an entrance into the lower cargo deck of the aircraft in which the total height clearance may be as little as 64 inches (1.62 meters). The framework member 11 is shown pivotally connected at flanges 28 with the framework member 10 so that when the framework assembly 5 is not required for use or when it itself is required to be transported, the framework member 11, with the removal of the struts 12, can be folded over so as to lie against the framework member 10. In that condition the arms 13 can also be disconnected from the framework 11.

The framework member 11 is shown diagrammatically as including the hydraulic ram member 16 or the like which, as described hereinbefore, enables the loading on the arms 13 to be checked and set at a required level.

The framework member 10 is shown provided with the lugs 22 or the like which suitably, as shown, may have apertures therein to enable the securement of the framework member 10 to the pallet (21) for transportation.

The front and rear parts 2,3 of the engine 1 can thus be split apart and transported, the transportation of the front end 2 being with the use of the framework assembly 5. On receipt of the front and rear engine parts 2,3 at their required destination they can then be reassembled using the technique illustrated in FIGS. 1 to 6 but in reverse order.

Figure 11:
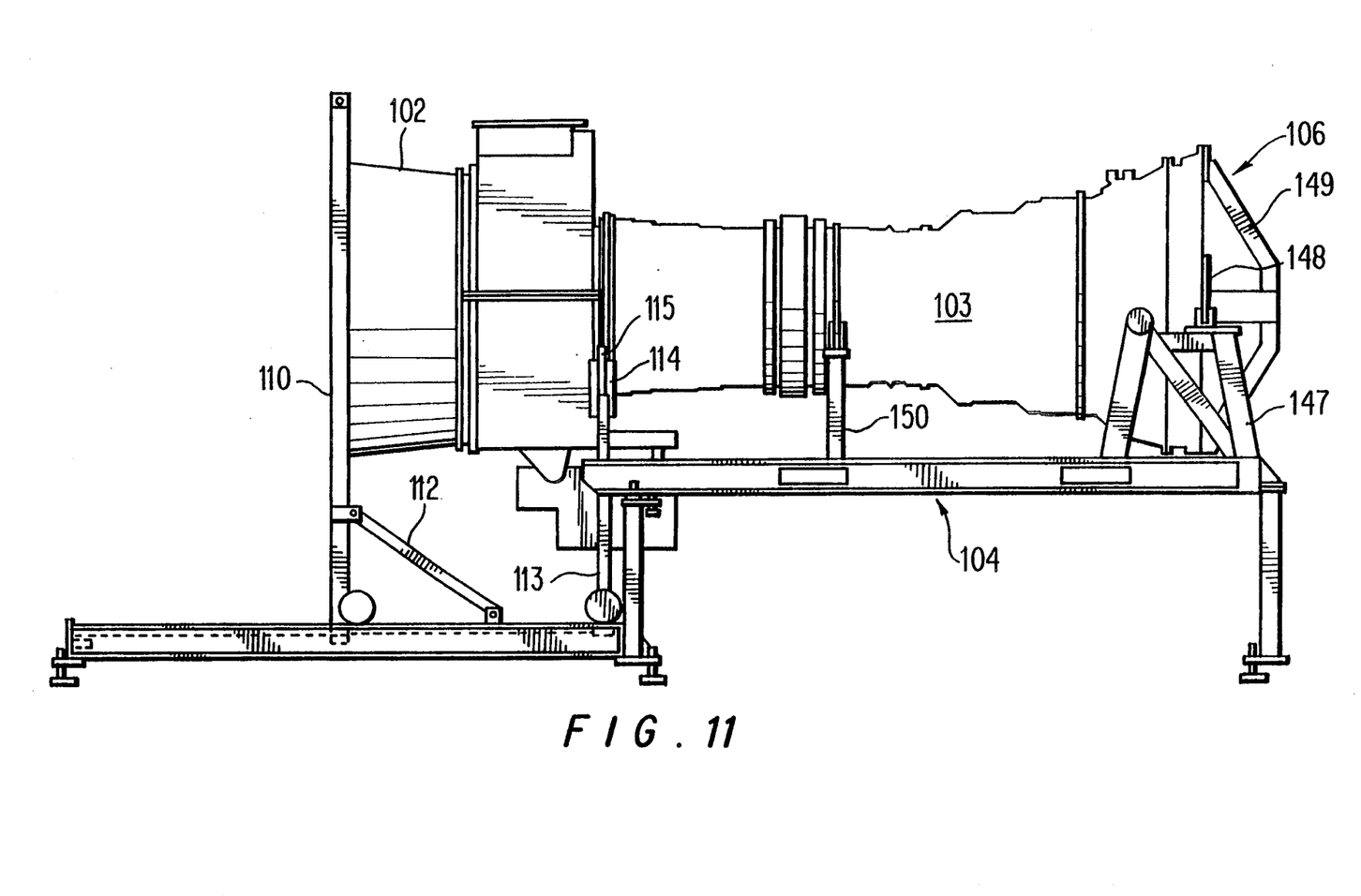
FIG. 11 shows the frame work of FIGS. 9 and 10 with the engine mounted thereon.
Figure 12:
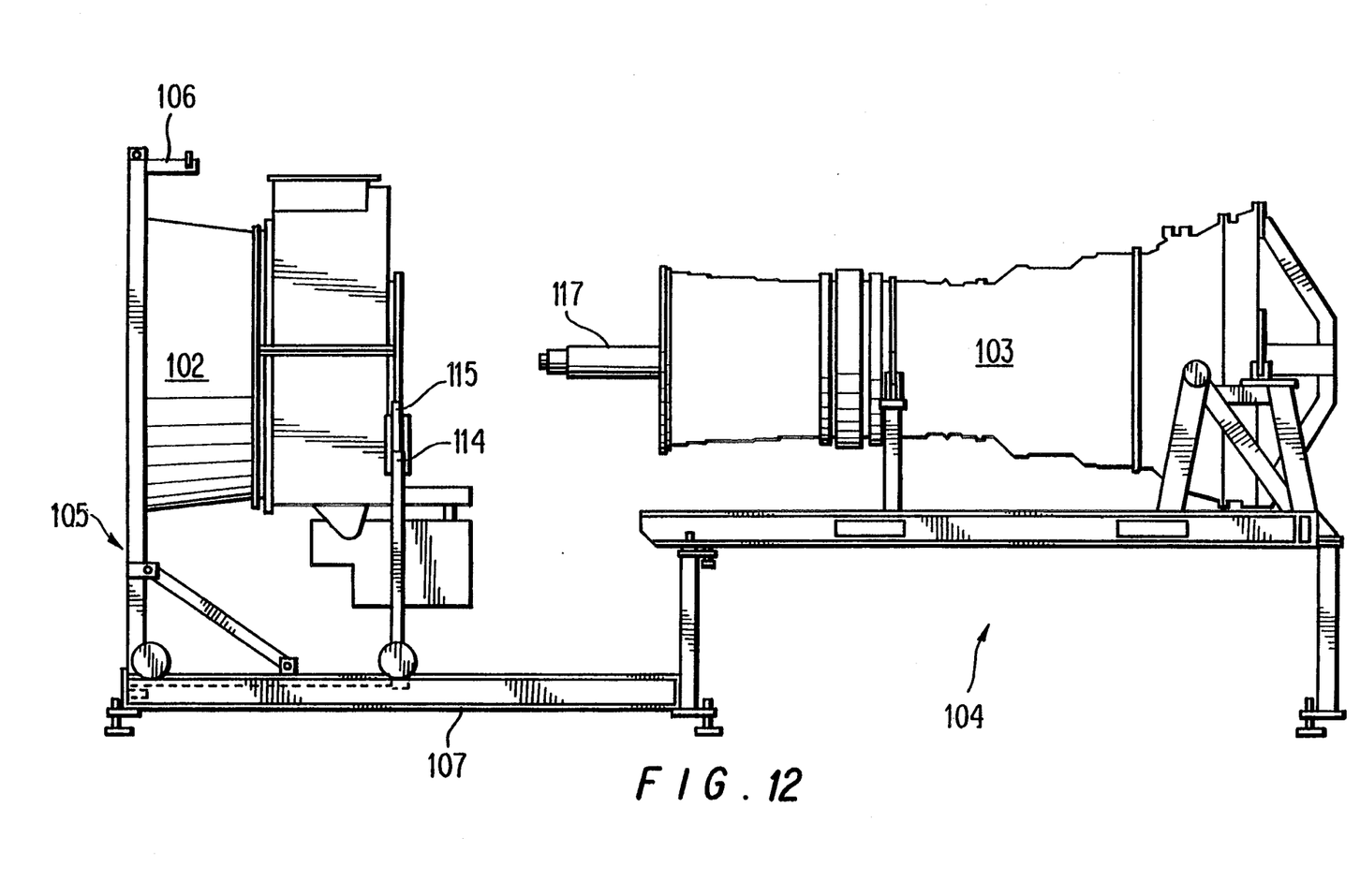
FIG. 12 shows a view of FIG. 11 but with the front and rear section separated.
Figure 13:
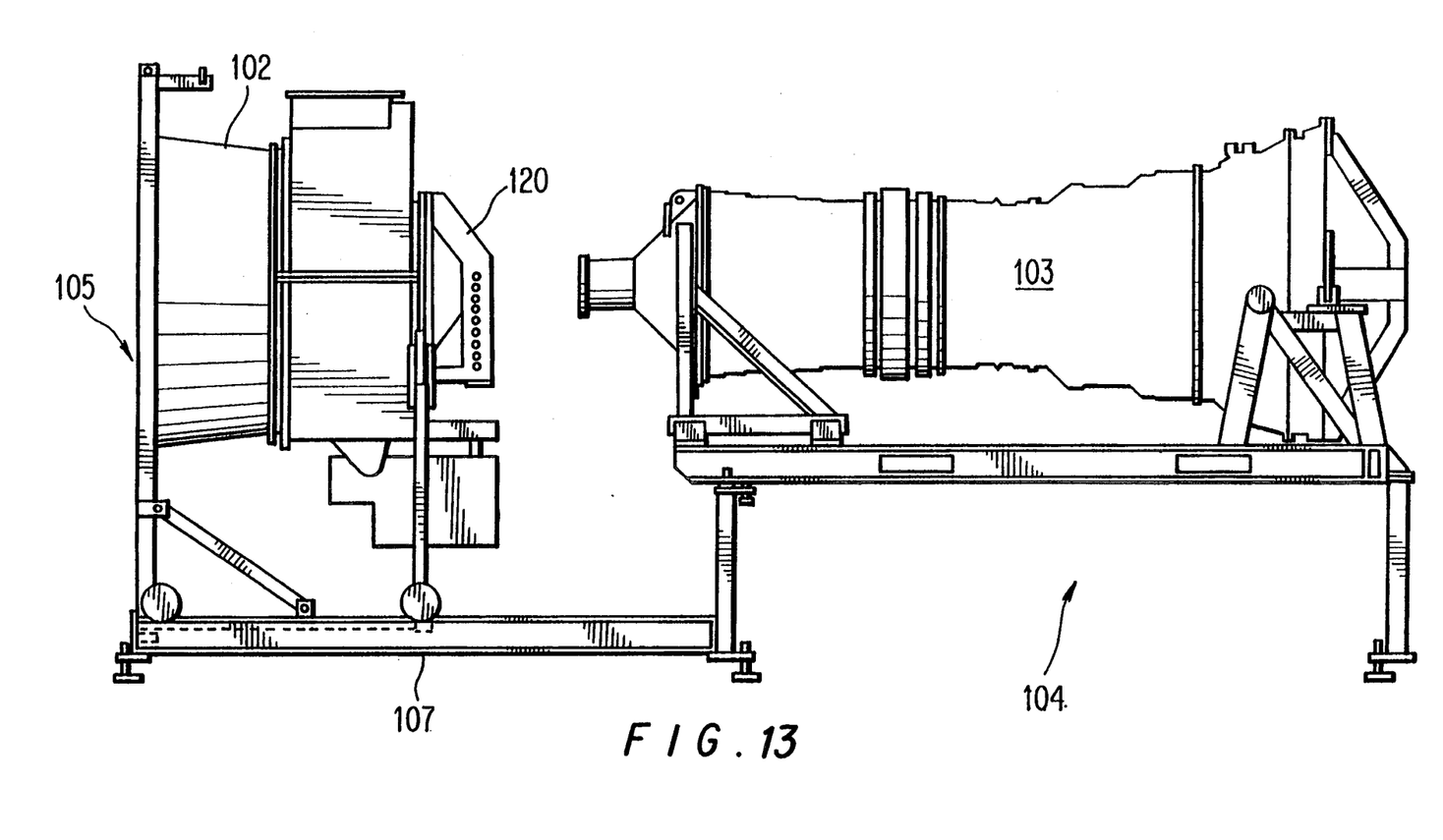
FIG. 13 shows a view of FIG. 12 with the front part of the engine outfitted with a rear support fixture.
Figure 14:
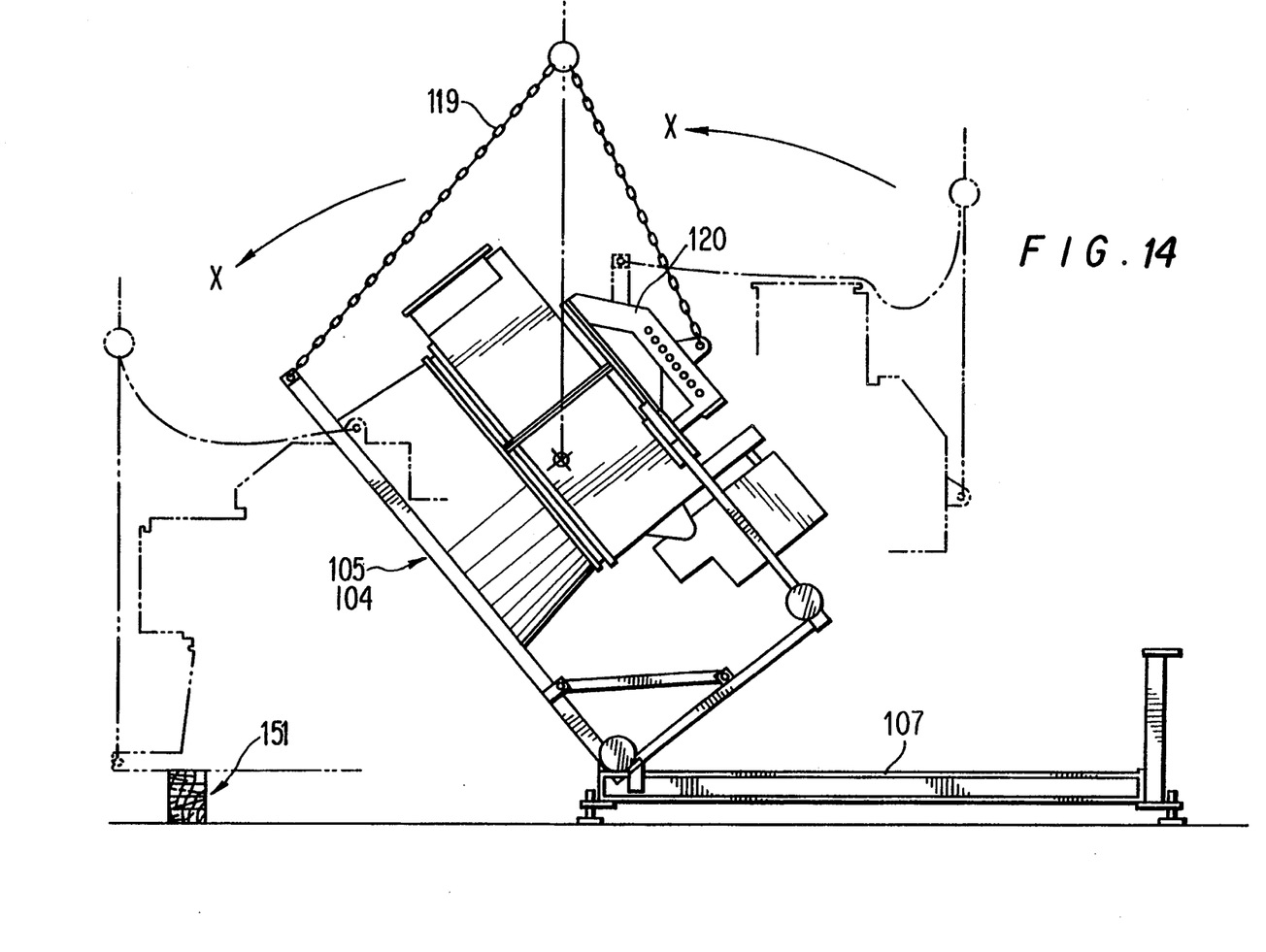
FIG. 14 shows the inversion of the front part of the engine.
Figure 15:
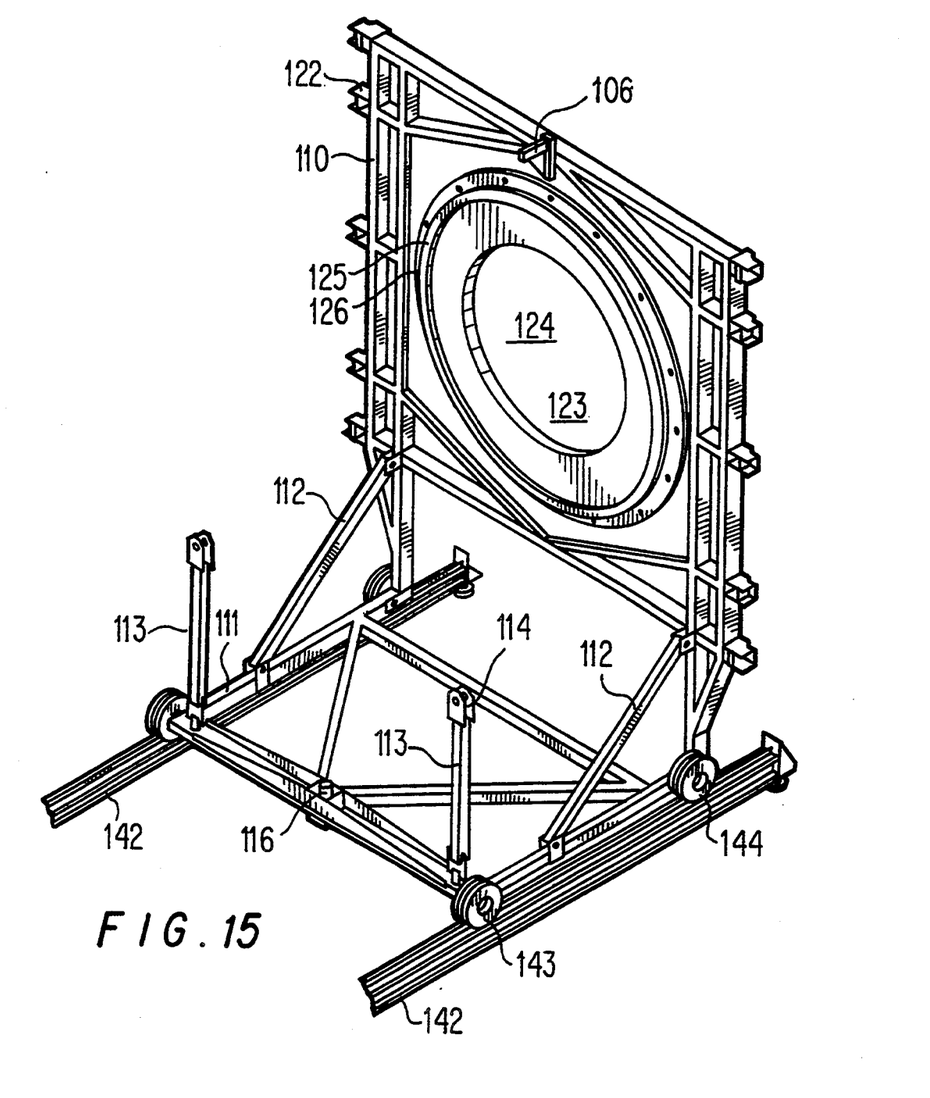
FIG. 15 shows an end perspective view of the support framework for the front end of the engine.
Figure 16:
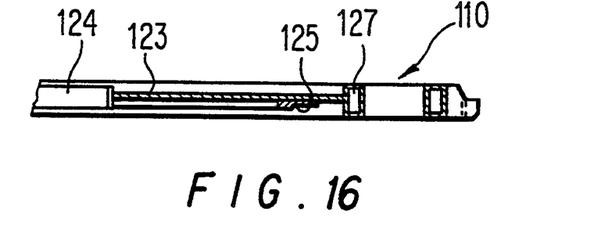
FIG. 16 shows an inverted cross sectional view through the front support assembly of FIG. 15.
Figure 17:
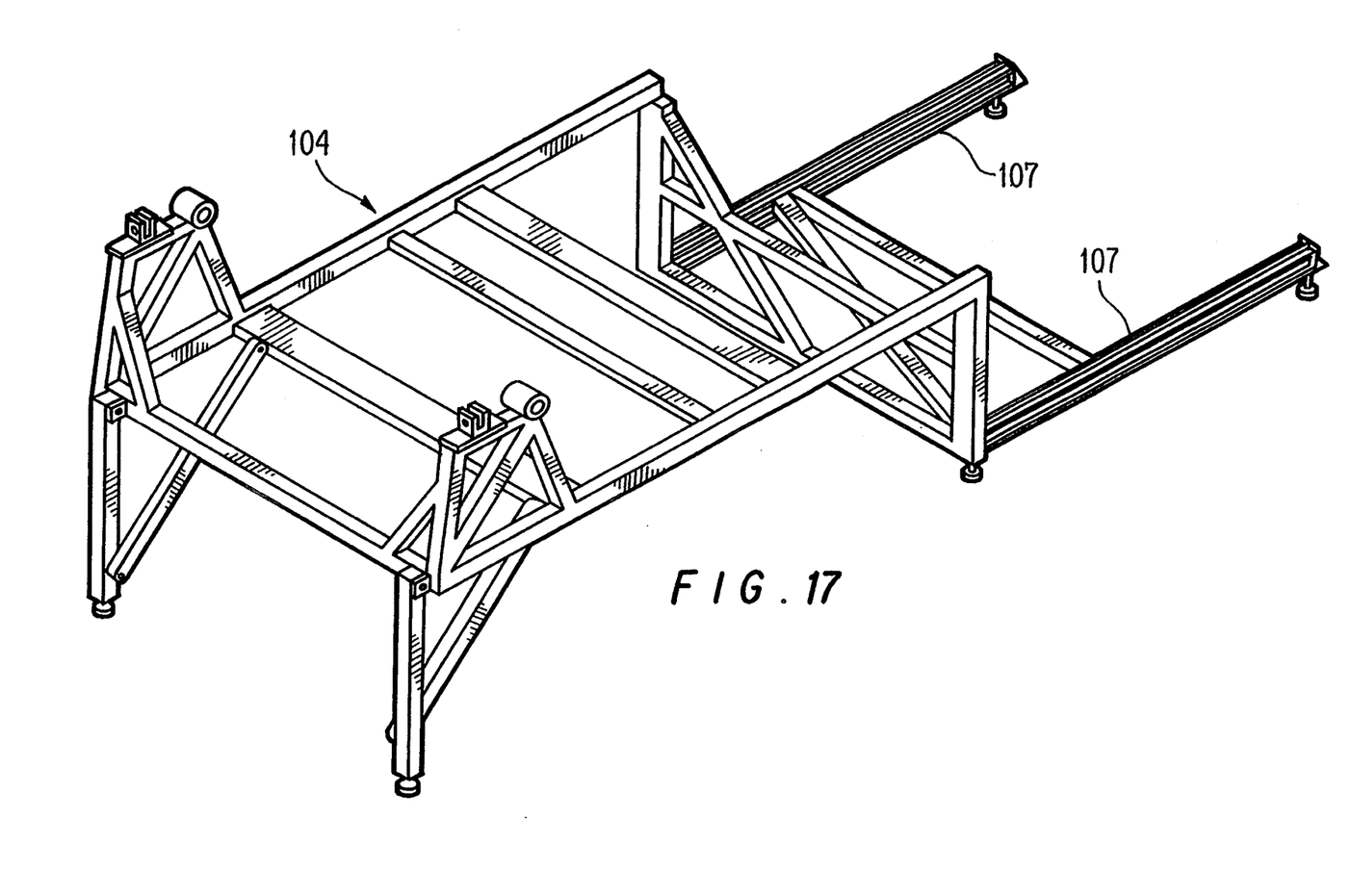
FIG. 17 shows an end perspective view of the rear support assembly of the framework of the preceding FIGS. 9 to 13.

Referring now to FIGS. 9 to 17 of the accompanying drawings, in an alternative embodiment of the invention, a support framework consists of a rear portion 104 and a front portion 107. The rear portion 104 has a support leg 140 with adjustable feet 141. The front portion 107 as shown particularly in FIG. 15 comprises a pair of spaced apart rails 142 providing a track for wheels 143 and 144 provided for a front engine support assembly 110. Side members 111, as shown in FIG. 15, can connect the wheels 143, 144 together and braces 112 can connect the side members to front support frame 110. As seen in FIG. 11, an engine having a portion 102 and rear portion 103 becomes positioned between front and rear framework members 110, 104. Stands 113 extending up from the cross member 116 between the wheels 143 (see FIG. 15) are shown terminating in a support member 114 which can engage with a flange 115 at the rear of the front engine portion 102. A support assembly 146 provided with rear portion 104 can provide the support for the rear end of the rear portion 103. The rear support 146 is shown including a support assembly 147 at each side engaging with and supporting a flange 148 at the rear of the engine. A support spider 149 is also shown secured to support the rear end of the rear of the engine 103. A more central support member 150 in the form of a bracket is also shown to provide a support about a mid-portion of the engine. In FIG. 12, the shaft 117 is shown withdrawn from the front end of the engine 102 with the splitting apart of the front and rear parts of the engine 102, 103, the front 102 being able to move away on wheels 143 and 144 engaging with the tracks 107. A support frame 120 is shown positioned about the rear part of the front of the engine 102 to compensate for the withdrawal of the shaft 116. As shown in FIG. 14, the front of the engine on its support 110 and supported by hoist 119 can now be pivoted through 90 degrees in a direction indicated by arrows X for securement onto a pallet or other transporting member 151 as shown in FIG. 14 and in the enlarged view of the region 126 shown in FIG. 16, which is shown inverted, the front support frame of 110 may include a substantially central aperture 124 to accommodate the front of the engine and to facilitate access thereto about which is provided a peripheral flange 123 and a raised outer rim 127. A plurality of lugs 122 facilitate the securement of member 110 to the pallet or the like when lying flat on it by bolts secured therethrough.

In this embodiment of the invention therefore, the movement of part of the front and rear section of the engine or their rejoining in the reverse operation is facilitated by the use of a ground surface track rather than by the use of a gantry as in the previous embodiment.

where in the foregoing description reference has been made to specific components or integers of the invention having known equivalents then such equivalents are herein incorporated as if individually set forth.

Although this invention has been described by way of example and with reference to possible embodiments thereof it is to be understood that modifications or improvements may be made thereto without departing from the scope of the invention as defined in the appended claims.

I claim:

1. An engine mounting apparatus comprising:

first and second spaced apart framework members for receiving and supporting a respective front portion and one of a rear portion of an engine and part of the engine, said front portion and said one of the rear portion of said engine and the part of said engine being separable from one another, said first framework member having first and second sections which define therebetween an angle of substantially 90 degrees, said first section having a first securing mechanism for securing said first section when in a substantially vertical portion with one of a front end of said front portion of said engine and said part of said engine, and said second framework section having a supporting mechanism for supporting, when in a ground engaging substantially horizontal position, one of a rear end of said front portion of said engine and said part of said engine upon one of said rear portion of said engine and said part of said engine being moved away, said first section having a hoist connection mechanism to enable said first framework member to be lifted with one of said front portion of said engine and said part of said engine secured thereto and for said first framework member to be turned substantially 90 degrees, a front surface of said first section having a second securing mechanism to secure said first section when turned through substantially 90 degrees with a transporting mechanism for carrying said first framework member and said one said front portion of said engine and said part of said engine secured thereto in a lower cargo compartment of a passenger aircraft.

2. An engine mounting apparatus as claimed in claim 1 wherein said first and second framework sections are pivotally connected together to allow said first and second sections to fold one on top of the other.

3. An engine mounting apparatus as claimed in claim 2 wherein said supporting mechanism comprises an engine bearing preloading mechanism for loading the bearing assembly with one of the front portion of said engine and said part of said engine to compensate for the removal of a shaft located at one of the rear portion of said engine and said part of said engine.

4. An engine mounting apparatus as claimed in claim 3 wherein said first framework member is provided with a height adjustment mechanism so that the height of one of the front portion of said engine and said part of said engine is adjustable relative to said rear portion to facilitate one of separation and attachment thereof together.

5. An engine mounting apparatus as claimed in claim 4 wherein said first framework section includes an apertured portion for receiving the front part of said front portion of said engine and said part of said engine and wherein said front portion is recessed so as to lower the overall height of said one of the mounted engine and said part of said engine when the first framework member has turned through 90 degrees for transportation purposes.

6. An engine mounting apparatus as claimed in claim 1 wherein said first framework member includes a track engageable transportation mechanism for separation of said front and said one of said rear portions of said engine and said part of said engine.

* * * * *